(12) United States Patent
Nowottnick

(10) Patent No.: US 9,070,003 B2
(45) Date of Patent: Jun. 30, 2015

(54) METHOD FOR HANDLING COLLISION IN AN IDENTIFICATION SYSTEM

(75) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 386 days.

(21) Appl. No.: 13/370,042

(22) Filed: Feb. 9, 2012

(65) Prior Publication Data
US 2012/0249308 A1  Oct. 4, 2012

(30) Foreign Application Priority Data
Apr. 4, 2011 (EP) .................................... 11160977

(51) Int. Cl.
 *H04Q 5/22* (2006.01)
 *G08B 13/14* (2006.01)
 *G06K 7/00* (2006.01)
 *G06K 7/10* (2006.01)

(52) U.S. Cl.
 CPC .......... *G06K 7/0008* (2013.01); *G06K 7/10108* (2013.01); *G08B 13/14* (2013.01); *H04Q 5/22* (2013.01)

(58) Field of Classification Search
 CPC ... G06K 7/0008; G06K 7/10049; G06K 7/08; G06K 7/10108; G06K 7/10039; G06K 19/0723; G06K 7/10059
 USPC ................................ 340/10.1–10.6; 342/359
 See application file for complete search history.

(56) References Cited

U.S. PATENT DOCUMENTS

| | | | |
|---|---|---|---|
| 6,535,109 B1 * | 3/2003 | Mahdavi ...................... | 340/10.3 |
| 6,988,667 B2 * | 1/2006 | Stewart et al. ................ | 235/492 |
| 7,053,755 B2 * | 5/2006 | Atkins et al. ............... | 340/10.51 |
| 7,987,405 B2 * | 7/2011 | Turner et al. .................. | 714/758 |
| 8,258,927 B1 * | 9/2012 | Warner et al. ................ | 340/10.2 |
| 2004/0046645 A1 | 3/2004 | Atkins et al. | |
| 2006/0044114 A1 * | 3/2006 | Friedrich et al. ............. | 340/10.2 |

FOREIGN PATENT DOCUMENTS

| | | |
|---|---|---|
| CN | 101145180 A | 3/2008 |
| CN | 101539983 A | 9/2009 |

(Continued)

OTHER PUBLICATIONS

Extended European Search Report for EP Patent Appln. No. 11160977.2 (Jun. 16, 2011).

(Continued)

*Primary Examiner* — Ariel Balaoing
*Assistant Examiner* — Mancil Littlejohn, Jr.

(57) ABSTRACT

A method for handling collision in an identification system where the identification system includes a reader, a first transponder and a second transponder. The method involves the reader transmitting an initialization command to the first transponder and to the second transponder; upon receiving the initialization command, the first transponder and the second transponder enter into a muted state where the first transponder and the second transponder do not respond to commands from the reader; in a randomly determined first start time slot the first transponder enters into an un-muted state and the first transponder remains in the un-muted state until the reader sends a mute command to the first transponder; in a randomly determined second start time slot the second transponder enters into an un-muted state and the second transponder remains in the un-muted state until the reader sends a mute command to the second transponder.

12 Claims, 4 Drawing Sheets

(56) References Cited

FOREIGN PATENT DOCUMENTS

| | | |
|---|---|---|
| EP | 0 467 036 A2 | 1/1992 |
| EP | 0585132 A1 | 3/1994 |
| EP | 1 017 005 A2 | 7/2000 |
| JP | 2007043269 A | 2/2007 |
| KR | 20100016850 A | 2/2010 |
| KR | 20100085370 A | 7/2010 |

OTHER PUBLICATIONS

Dheeraj K. Klair, et al.; "A Novel Anti-Collision Protocol for Energy Efficient Identification and Monitoring in RFID-Enhanced WSNs"; ICCCN 2008: 22-29; 2008.

Shih, Dong-Her et al.; "Taxonomy and Survey of RFID anti-collision protocols"; Elsevier; Computer Communications 29; pp. 2151-2153; 2006.

* cited by examiner

METHOD FOR HANDLING COLLISION IN AN IDENTIFICATION SYSTEM

CROSS-REFERENCE TO RELATED APPLICATIONS

This application claims the priority under 35 U.S.C. §119 of European patent application no. 11160977.2, filed on Apr. 4, 2011, the contents of which are incorporated by reference herein.

FIELD OF THE INVENTION

The invention relates to a method for handling collision in an identification system. The invention also relates to an identification system.

BACKGROUND OF THE INVENTION

In recent years, radio frequency identification (RFID) has gained a lot of publicity. An important advantage of RFID is its ability to identify multiple objects or tags wirelessly without a direct line of sight between the objects and the reader device. Furthermore, the versatility of RFID tags in terms of their shapes, sizes, ranges and types makes them superior to conventional bar codes.

RFID is a system for tracking and identifying multiple objects in a reader's interrogation zone simultaneously via magnetic or electromagnetic response exchange. Such a system typically consists of an RFID reader device and a finite number of RFID tags. The tags contain miniaturized integrated circuits with a small antenna for communicating with the reader device. Usually, identification information can be stored in the integrated circuits. RFID tags can be active, passive or semi-passive. Passive tags have no power source: they use the power emitted by the reader device to energize and transmit their identification codes to the reader device. Semi-passive and active tags have an on-board power source, and are activated by a reader's field. Active tags do not require the reader to be present in order to operate; they have an on-board transmitter for sending data or identification codes. Passive and semi-passive tags are cheap compared to active tags, and are therefore more suitable for large-scale deployments.

In the technical field of identification systems, tags are also referred to as transponders. A reader device is also referred to as a base station. The data or identification codes are, for example, the serial numbers of transponders in a magnetic field.

An important aspect of RFID systems is the use of so-called anti-collision protocols. Tag collisions arise when multiple tags respond simultaneously to a reader's request. FIG. 1 illustrates a prior art identification system wherein a reader R receives, via an antenna A, simultaneous responses from multiple transponders T1-T4. This results in collisions at the reader, which leads to bandwidth and energy wastage, and a prolonged tag identification time.

Many anti-collision protocols have been designed in order to resolve and avoid collisions. The anti-collision protocols according to the prior art typically deploy schemes wherein a dedicated active time slot is randomly selected for transmission of the data or identification codes. The use of these dedicated active time slots increases the complexity of the slot allocations and therefore the overall cost.

SUMMARY OF THE INVENTION

It is an object of the invention to simplify the anti-collision protocols of the kind set forth, thereby reducing the overall cost of identification systems in which said protocols are applied. This is achieved by a method for handling collision according to claim 1 and by an identification system according to claim 5.

According to an aspect of the invention, a method for handling collision in an identification system is provided, wherein the identification system comprises a reader device, a first transponder and a second transponder, and the method comprises the following steps: the reader device transmits an initialization command to the first transponder and to the second transponder; upon receiving the initialization command, the first transponder and the second transponder enter into a muted state, and in the muted state the first transponder and the second transponder do not respond to commands from the reader device; in a randomly determined first start time slot the first transponder enters into an un-muted state and the first transponder remains in the un-muted state until the reader device sends a mute command to the first transponder; in a randomly determined second start time slot the second transponder enters into an un-muted state and the second transponder remains in the un-muted state until the reader device sends a mute command to the second transponder.

According to another aspect of the invention, the first transponder and the second transponder respond to commands from the reader device when they are in the un-muted state.

According to yet another aspect of the invention, the commands from the reader device comprise requests for identification codes, and the first transponder and the second transponder, upon receipt of said requests, transmit a first identification code and a second identification code, respectively, to the reader device.

According to yet another aspect of the invention, if a strong collision occurs during simultaneous transmission of the first identification code and the second identification code, the identification system is re-initialized and the method is re-applied.

According to an aspect of the invention, an identification system is provided which comprises a reader device, a first transponder and a second transponder, wherein the reader device is arranged to transmit an initialization command to the first transponder and to the second transponder; wherein the first transponder and the second transponder are arranged to enter into a muted state upon receipt of the initialization command; wherein, in the muted state, the first transponder and the second transponder are arranged to refrain from responding to commands from the reader device; wherein, in a randomly determined first start time slot, the first transponder is arranged to enter into an un-muted state and the first transponder is arranged to remain in the un-muted state until the reader device sends a mute command to the first transponder; wherein, in a randomly determined second start time slot, the second transponder is arranged to enter into an un-muted state and the second transponder is arranged to remain in the un-muted state until the reader device sends a mute command to the second transponder.

BRIEF DESCRIPTION OF THE DRAWINGS

The invention will be described in more detail with reference to the appended drawings, in which.

DESCRIPTION OF PREFERRED EMBODIMENTS

Figure 1:
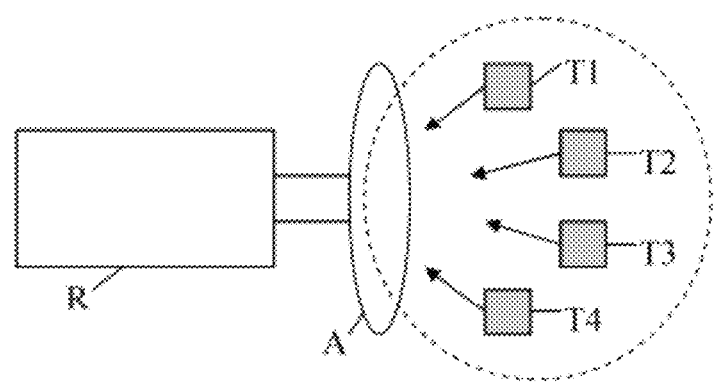
FIG. 1 illustrates a prior art identification system.

FIG. 1 illustrates a prior art identification system wherein a reader R receives, via an antenna A, simultaneous responses from multiple transponders T1-T4. This results in collisions at the reader, which leads to bandwidth and energy wastage, and a prolonged tag identification time.

Figure 2:
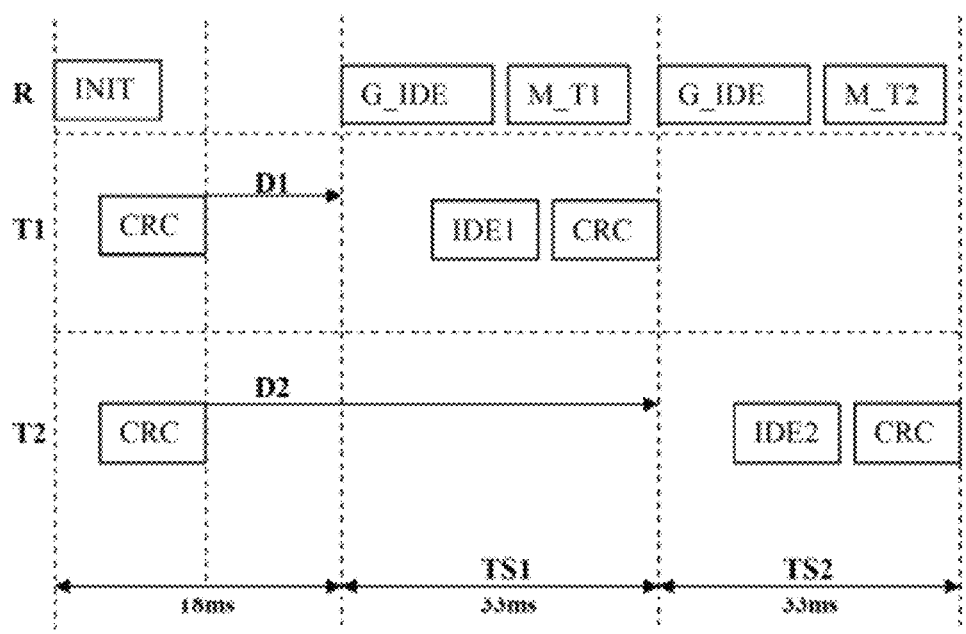
FIG. 2 illustrates a first example of a method according to the invention.

FIG. 2 illustrates a first example of a method according to the invention. In particular, it shows a collision-free communication sequence. In a first step of the anti-collision sequence, the reader R initializes the transponders T1, T2 with an initialization command. Subsequently, the transponders T1, T2 enter, upon receipt of the initialization command, into a muted state for a randomly determined amount of time D1, D2. The randomly determined amount of time D1, D2 is based on the result of a random number calculation and the end of this amount of time D1, D2 marks the beginning of a start time slot for the un-muting of the transponders D1, D2.

In the present example, the first transponder T1 enters into an un-muted state in a first start time slot TS1, and the second transponder D2 enters into an un-muted state in a second start time slot TS2 which is directly subsequent to the first start time slot TS2. In the un-muted state, the transponders T1, T2 respond to commands from the reader R. So, in this particular example, the first transponder T1 responds to a command G_IDE from the reader R to deliver an identification code IDE1, for example the serial number of the first transponder T1, by transmitting said identification code IDE1 to the reader R. Since the second transponder T2 is still in the muted state in the first start time slot TS1, it does not interfere with the communication between the reader R and the first transponder T1. After receipt of the identification code IDE1 from the first transponder T1, the reader R sends a mute command M_T1 to the first transponder T1. Therefore, the first transponder will be in the muted state again in the next time slot, i.e. in the second start time slot TS2. The second transponder T2 receives the command G_IDE to deliver its identification code IDE2, and transmits said identification code IDE2 to the reader R. Thereafter, the second transponder T2 can also be muted by a mute command M_T2. Since the first transponder T1 is back in the muted state in the second start time slot TS2, it does not interfere with the communication between the reader R and the second transponder T2. So-called cyclic redundancy codes CRC are also transmitted to the reader R, so that the reader R can verify whether the identification codes IDE1, IDE2 have been received in good order.

The basic concept is that each transponder T1, T2 becomes active in its respective start time slot TS1, TS2 and remains active until a mute command M_T1, M_T2 is applied to it, so in principle a transponder can remain active for many time slots. In the present example, however, the transponders T1, T2 remain active only for a single time slot.

Figure 3:
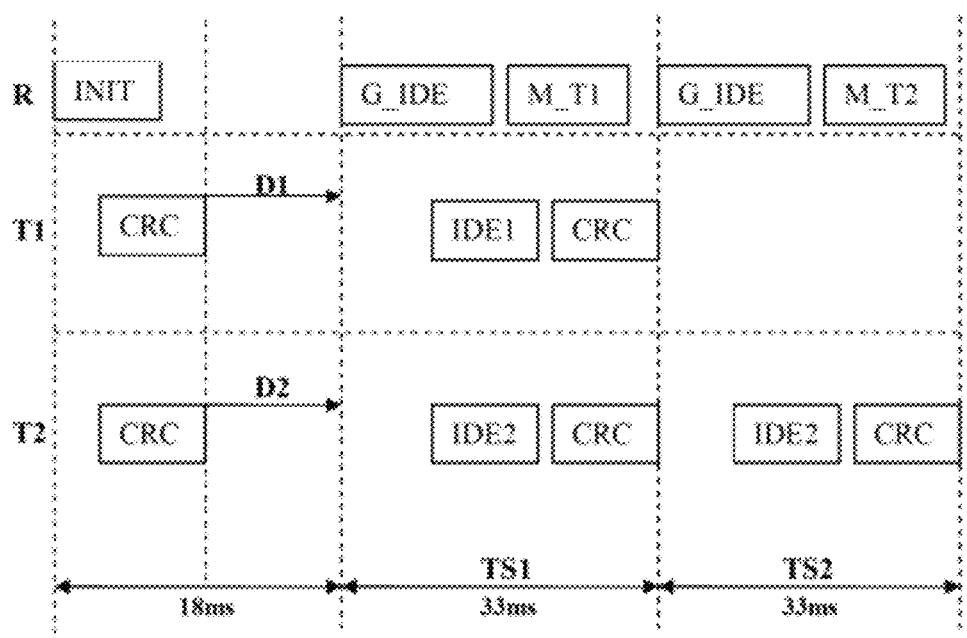
FIG. 3 illustrates a second example of a method according to the invention.

FIG. 3 illustrates a second example of a method according to the invention. In particular, it shows a communication sequence with a weak collision. A weak collision occurs when the signal modulation of one transponder is strong compared to the signal modulation of the other transponder. Again, with the initialization command INIT the first transponder T1 and the second transponder T2 are initialized for the anti-collision sequence. Again, the transponders T1, T2 enter, upon receipt of the initialization command, into a muted state for a randomly determined amount of time D1, D2. The randomly determined amount of time D1, D2 is based on the result of a random number calculation and the end of this amount of time D1, D2 marks the beginning of a start time slot for the un-muting of the transponders D1, D2.

In the present example the randomly determined amount of time D1 for the first transponder T1 is equal to the randomly determined amount of time D2 for the second transponder T2, so both the first transponder T1 and the second transponder T2 become active at the same time. After receipt of a command G_IDE from the reader R to deliver an identification code IDE1, IDE2, both transponders T1, T2 transmit their identification codes IDE1, IDE2 to the reader R. However, the transmission of the second identification code IDE2 is overruled, because the signal carrying the first identification code IDE1 is stronger modulated than the signal carrying the second identification code IDE2. The signal carrying the second identification code IDE2 does not interfere with the process of receiving the first identification code IDE1, so the reader R correctly detects the first identification code IDE1 in the first start time slot TS1. In the next time slot the first transponder T1 is muted by a mute command M_T1 from the reader R. The second transponder T2 is still active in the next time slot, so the second identification code IDE2 can safely be read without interference from the (muted) first transponder T1.

This example clearly shows the reduction in complexity achieved by the proposed anti-collision sequence for transponder applications; only a start time slot needs to be defined and transponders may remain active for subsequent time slots until they are muted by a reader command. This is a relatively simple way of allocating time slots. The calculation effort needed for the implementation of this method is low compared to the calculation effort needed for the allocation of dedicated time slots to each transponder.

Figure 4:
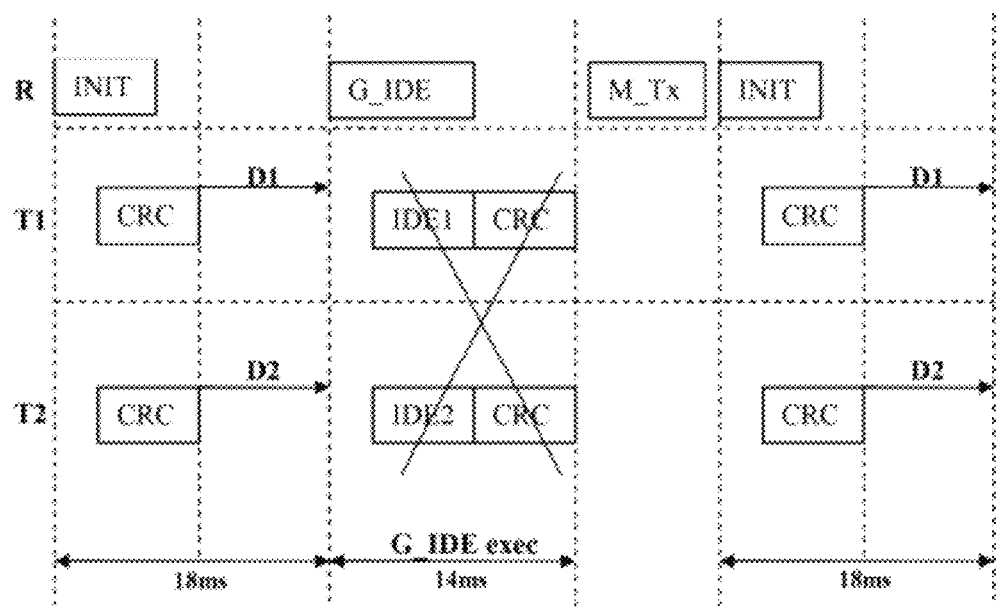
FIG. 4 illustrates a third example of a method according to the invention.

FIG. 4 illustrates a third example of a method according to the invention. In particular, it shows a communication sequence with a strong collision. A strong collision occurs when the signal modulation of one transponder is substantially of the same strength as the signal modulation of the other transponder. Again, with the initialization command INIT the first transponder T1 and the second transponder T2 are initialized for the anti-collision sequence. Again, the transponders T1, T2 enter, upon receipt of the initialization command, into a muted state for a randomly determined amount of time D1, D2. The randomly determined amount of time D1, D2 is based on the result of a random number calculation and the end of this amount of time D1, D2 marks the beginning of a start time slot for the un-muting of the transponders D1, D2.

In the present example the randomly determined amount of time D1 for the first transponder T1 is equal to the randomly determined amount of time D2 for the second transponder T2, so both the first transponder T1 and the second transponder T2 become active at the same time. After receipt of a command G_IDE from the reader R to deliver an identification code IDE1, IDE2, both transponders T1, T2 transmit their identification codes IDE1, IDE2 to the reader R. In this case there is a strong collision, which is detected, for example, by a mismatch occurring as a result of the cyclic redundancy check CRC. Therefore, the anti-collision sequence is stopped and both transponders T1, T2 are optionally muted by a mute command M_Tx. The magnetic field may be reset, in which case the transponders T1, T2 need not be muted. Subsequently, the initialization command INIT is repeated, which effectively restarts an anti-collision sequence. There is a high probability that, in the new sequence, the first start time slot TS1 will be different from the second start time slot TS2. Therefore, it is likely that the strong collision will not occur again, because one of the transponders T1, T2 will be in the muted state when the other transponder transmits its identification code IDE1, IDE2 to the reader R. It will be appreciated that the anti-collision sequences are repeated until every transponder in the magnetic field has safely transmitted its identification codes to the reader.

The above-mentioned preferred embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SYMBOLS

R reader
A antenna
T1-T4 transponders
INIT initialization command
CRC cyclic redundancy check
D1 randomly determined amount of time
D2 randomly determined amount of time
T1 first transponder
T2 second transponder
TS1 first start time slot
TS2 second start time slot
G_IDE command to deliver an identification code from a transponder
IDE1 first identification code
IDE2 second identification code
M_T1 mute command
M_T2 mute command
M_Tx mute command
exec execution of a command

The invention claimed is:

1. A method for handling collision in an identification system the method comprising the following steps:
a reader device transmits an initialization command to a first transponder and to a second transponder;
upon receiving the initialization command, the first transponder and the second transponder enter into a muted state, and in the muted state the first transponder and the second transponder do not respond to commands from the reader device;
in a first start time slot randomly determined by the first transponder, the first transponder enters into an un-muted state from the muted state and the first transponder remains in the un-muted state until the reader device sends a mute command to the first transponder;
in a second start time slot randomly determined by the second transponder, the second transponder enters into an un-muted state from the muted state and the second transponder remains in the un-muted state until the reader device sends a mute command to the second transponder;
wherein, when the first start time slot and the second time slot occur at the same randomly determined time slot, then:
when a transponder has a weaker signal modulation than another transponder, then the transponder with the weaker signal modulation re-enters into a muted state until a third start time slot randomly determined by the transponder corresponding to the weaker signal modulation; and
when the signal modulation of the first transponder and the second transponder have substantially the same strength, then the first transponder and the second transponder re-enter into a muted state until a start time slot randomly determined by the corresponding transponder.

2. A method as claimed in claim 1,
wherein, in the un-muted state, the first transponder and the second transponder respond to commands from the reader device.

3. A method as claimed in claim 2,
wherein the commands from the reader device comprise requests for identification codes, and wherein the first transponder and the second transponder, upon receipt of said requests, transmit a first identification code and a second identification code, respectively, to the reader device.

4. A method as claimed in claim 3,
wherein, if a strong collision occurs during simultaneous transmission of the first identification code and the second identification code, the identification system is re-initialized and the method is re-applied.

5. An identification system comprising a reader device, a first transponder and a second transponder,
wherein the reader device is arranged to transmit an initialization command to the first transponder and to the second transponder;
wherein the first transponder and the second transponder are arranged to enter into a muted state upon receipt of the initialization command;
wherein, in the muted state, the first transponder and the second transponder are arranged to refrain from responding to commands from the reader device;
wherein, in a first start time slot randomly determined by the first transponder, the first transponder is arranged to enter into an un-muted state from the muted state and the first transponder is arranged to remain in the un-muted state until the reader device sends a mute command to the first transponder;
wherein, in a second start time slot randomly determined by the second transponder, the second transponder is arranged to enter into an un-muted state from the muted state and the second transponder is arranged to remain in the un-muted state until the reader device sends a mute command to the second transponder;
wherein, when the first start time slot and the second time slot occur at the same randomly determined time slot, then:
when a transponder has a weaker signal modulation than another transponder, then the transponder with the weaker signal modulation re-enters into a muted state until a third start time slot randomly determined by the transponder corresponding to the weaker signal modulation; and
when the signal modulation of the first transponder and the second transponder have substantially the same strength, then the first transponder and the second transponder re-enter into a muted state until a start time slot randomly determined by the corresponding transponder.

6. The method of claim 3, wherein the responses to commands from the reader further comprise cyclic redundancy codes, the cyclic redundancy codes having a predefined relationship to identification codes of the transponders.

7. A method for handling collision by a transponder in an identification system, the method comprising:

upon receiving an initialization command from a reader device, a transponder enters into a muted state and, in the muted state, the transponder does not respond to external commands;

in a start time slot randomly determined by the transponder, the transponder enters into an un-muted state from the muted state and remains in the un-muted state until at least one of:

a collision occurs with another transponder having a stronger modulated signal, upon which the transponder re-enters into a muted state until a second start time slot randomly determined by the transponder; or a collision occurs with another transponder having a substantially similar strength modulated signal, upon which the transponder re-enters into a muted state until a second start time slot randomly determined by the transponder.

8. The method of claim 7, wherein the transponder remains un-muted for more than one time slot.

9. The method as claimed in claim 7, wherein, in the un-muted state, the transponder responds to commands from the reader device.

10. The method as claimed in claim 9, wherein the commands from the reader device comprise requests for identification codes, and wherein the transponder, upon receipt of said requests, transmits an identification code to the reader device.

11. The method as claimed in claim 10, wherein, if a strong collision occurs during transmission of the identification code, the identification system is re-initialized and the method is re-applied.

12. The method of claim 10, wherein the responses to commands from the reader further comprise cyclic redundancy codes, the cyclic redundancy codes having a predefined relationship to identification codes of the transponders.

* * * * *